Oct. 2, 1951  W. T. HANNA  2,569,811
TENDER CONVEYER SYSTEM FOR LOCOMOTIVE STOKERS
Filed Sept. 16, 1947  2 Sheets-Sheet 1
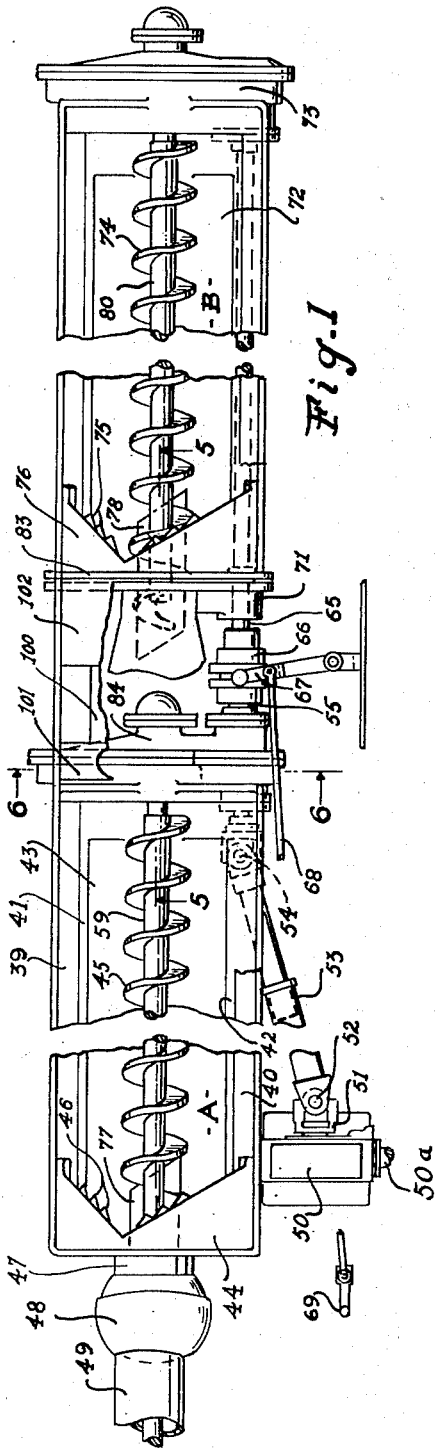
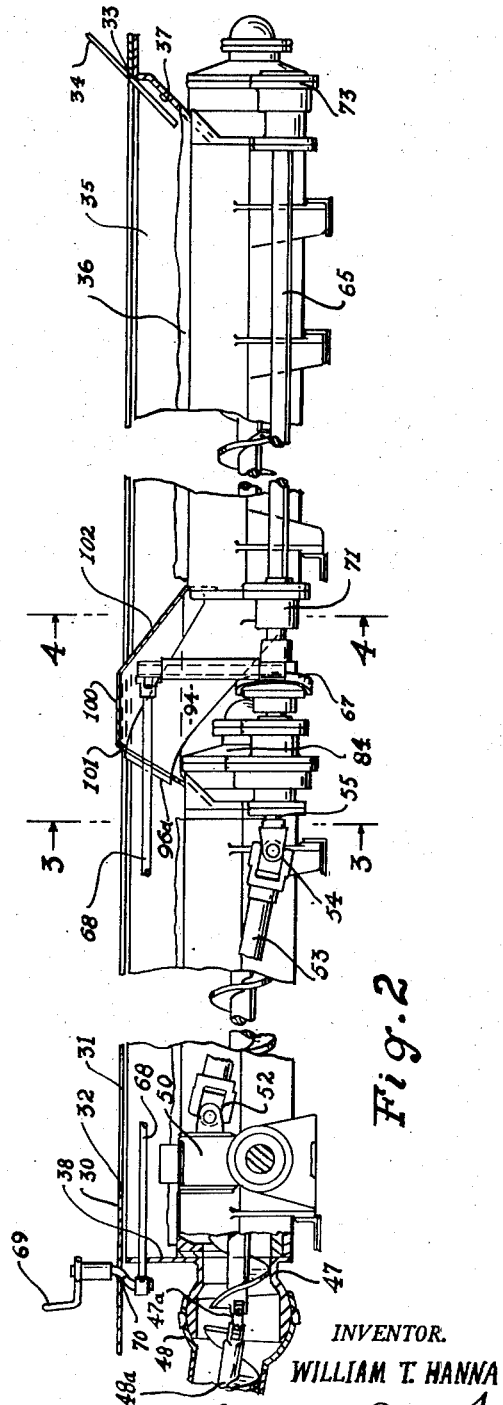
INVENTOR.
WILLIAM T. HANNA
BY
HIS ATTORNEYS Oct. 2, 1951  W. T. HANNA  2,569,811
TENDER CONVEYER SYSTEM FOR LOCOMOTIVE STOKERS
Filed Sept. 16, 1947  2 Sheets-Sheet 2

INVENTOR.
WILLIAM T. HANNA
BY
HIS ATTORNEYS

Patented Oct. 2, 1951

2,569,811

UNITED STATES PATENT OFFICE 2,569,811

TENDER CONVEYER SYSTEM FOR LOCOMOTIVE STOKERS

William T. Hanna, Cincinnati, Ohio; Richard W. Todd executor of said William T. Hanna, deceased Application September 16, 1947, Serial No. 774,199

5 Claims. (Cl. 198—15)

This invention relates to a tender conveyor system for a locomotive stoker, and more particularly pertains to a dual-tandem type of conveyor system for use with long tenders.

The invention provides means for moving solid fuel, such as coal, from a locomotive tender fuel bin to the locomotive stoking apparatus, and the system employs a plurality of fuel conveyors, each comprising a trough in which a conveyor screw rotates, said conveyors being arranged in tandem.

It is not feasible to use a single long screw in a single trough for a long tender, inasmuch as such screws are ordinarily driven from the rear, and any substantial increase over standard lengths demands such large driving forces and such increased diameter of the screw shaft as to make the mechanism too bulky for the available space.

I have devised a dual-tandem type of conveyor wherein the troughs and screws are arranged in axial alignment and the fuel transferred from a rear conveyor to a front conveyor by means of a novel by-pass conduit.

I have disclosed my novel fuel conveyor, for a long tender, in a system in which I utilize two short conveyors arranged in tandem, with the conveyor screws in axial alignment, and having a conduit extending from the front end of the rear conveyor to the rear end of the front conveyor. The aforesaid conduit by-passes the rear drive of the front conveyor without substantially interfering with the normal construction of the tender. By using conventional construction, the parts of my dual-tandem stoker are readily available for repair, utilize duplicate parts, and may be driven selectively by a single power source.

The conduit which I provide for transferring fuel from the front end of the rear conveyor to the rear end of the front conveyor is of novel construction in that, as it extends upwardly and forwardly from the rear conveyor and across the rear drive of the front conveyor screw, it changes from a circular cross-section to a flattened oval cross-section, the flattening being on top and bottom so as to avoid interference with the contours of the tender floor by bulging upwardly therethrough. By the novel design of this conduit I achieve an unhampered transfer of fuel with a minimum increase in vertical spacing caused by the overhang of said conduit at the rear end of the front conveyor.

Although the disclosed embodiment utilizes but two conveyor units in tandem it will be obvious that more than two can be so arranged.

It is, therefore, an object of my invention to provide a fuel conveying system for a locomotive tender which includes two or more troughs and two or more screws operating in tandem, with troughs and screws in axial alignment.

Another object of the invention is to provide such a conveyor system in which a rear conveyor delivers fuel to a front conveyor by means of a transfer conduit which carries the fuel forward over the driving means located at the rear of the front conveyor.

Another object of my invention is to provide, in such a conveyor system, a special formation for the conduit whereby the vertical height of the system is minimized.

Another object of the invention is to provide such a conveyor system including two like conveyors mounted end to end horizontally, in tandem, with the screws in axial alignment, and each of said screws having an independent rear drive means.

With these and other objects in view, which will appear in the description and claims to follow, I describe my invention with reference to the drawings in which:

Fig. 1 is a plan view of my conveyor system, with a portion of the front and rear sections broken away.

Fig. 2 is a side elevation of the substance of Fig. 1.

In the drawings the same reference numbers apply to the same parts throughout the several views, and the sections are taken looking in the direction of the arrows at the ends of the section lines.

Figure 3:
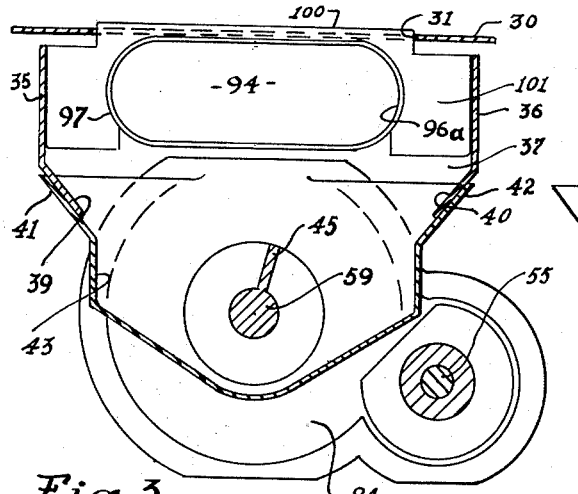
Fig. 3 is a section on the line 3—3 of Fig. 2.
Figure 4:
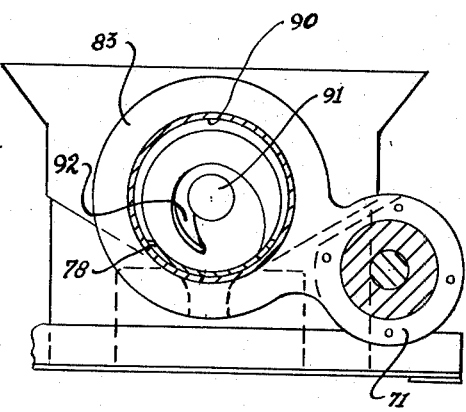
Fig. 4 is a section on the line 4—4 of Fig. 2.

Referring, first, to Fig. 2, there is shown a floor or deck 30 of the fuel compartment or bin of a locomotive tender, said deck having a longitudinal opening 31 terminating at the forward end at point 32 and terminating at the rear end at point 33. At the rear end of said opening a slope sheet 34 is provided, as is customary, to direct the flow of fuel, held in the bin, into the opening. Beneath opening 31 is a hopper provided with side walls 35 and 36 (see also Fig. 3), and end walls 37 and 38. Lower portions of the side walls of the fuel hopper, adjacent the conveyor troughs to be described, are bent inwardly as are portions 39 and 40 (Fig. 3) and are secured to the upper side walls of the adjacent troughs such as the trough side walls 41 and 42, associated with the forward one of two conveyor units, to be described.

The two conveyor units to be described, which comprise the conveyor system, are shown in Fig. 1, generally, as unit A and unit B. These units, A and B, are positioned in end to end relation, beneath the fuel hopper, just described, and receive fuel from said bin, into their respective troughs in which the respective conveyor screws, to be described, are located.

The side walls of the bin may be cut away where they pass over the rear end of unit A and the forward end of unit B, to make clearance for the end walls of their respective troughs. Such cut away clearance is shown at 35a in Fig. 5.

Figure 6:
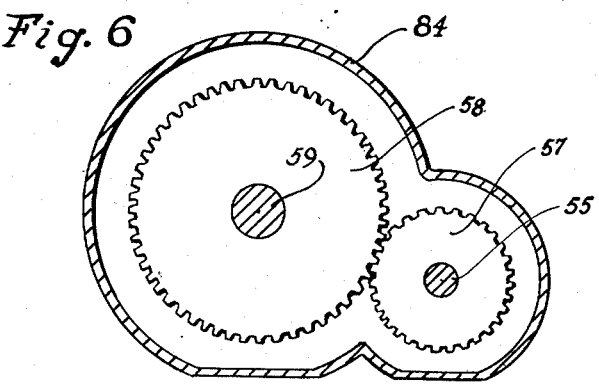
Fig. 6 is a section on the line 6—6 of Fig. 1.

Referring to Figs. 1 and 2, conveyor unit A includes a fuel trough 43, which may be seen in section in Fig. 3, said trough being provided with a fuel crusher unit 44 at its forward end, by which fuel moved forwardly by rotation of conveyor screw 45 is carried against the points 46 to reduce the size of the lumps, so they may be delivered through a delivery conduit 47 coupled by a ball and socket device 48 to a riser conduit 49 leading to the fire box of a locomotive, as is well known in the art, and which is described, for instance, in my United States Letters Patent No. 2,380,840. The screw 45 is driven by an engine shaft 50a, worm gear reduction unit 50, shaft member 51, universal joint 52, drive shaft 53, universal joint 54, gear shaft 55 (see also Fig. 6), gear 57 and gear 58, to which is connected the shaft 59 of the spiral flighted conveyor screw 45, before mentioned. Gears 57 and 58 are mounted within a gear casing 84 the forward section of which is integral with the trough 43. The forward end of screw 45 extends into conduit 47 where it is coupled by universal joint 47a to auxiliary screw 48a in conduit 48.

Extending to the rear of the gear casing 84 is a section of the shaft 55 (see Fig. 1) connectable and disconnectable from a shaft 65 by a clutch 66 shiftable to engaging or disengaging position by means of a yoke 67 operated by link 68 shifted by handle crank 69 through the medium of pitman 70 (see also Fig. 2). Shaft 65 mounted in bearing 71 extends rearwardly along the side of the trough 72 of the rear conveyor unit B and, through gears located in gear casing 73 drives conveyor screw 74 to move fuel toward the points 75 of fuel crusher member 76 located in the forward end of the trough 72.

In each of the troughs there is bearing plate for the forward end of the screw, that for screw 45 of unit A being shown at 77, and that for screw 74 of unit B being shown at 78. The screws 45 and 74 have their shafts 59 and 80 in axial alignment.

Inasmuch as fuel is delivered from the rear unit B through an opening in the forward end wall 83 of trough 72, it is apparent that, in order for such delivered fuel to be dumped into trough 43 of the forward unit A, the conduit carrying such fuel must by-pass the gear casing 84 of the forward unit A of the conveyor system and must be dumped into the top opening of trough 43. It will be apparent that, inasmuch as troughs 43 and 72 are separated, there is a place along the opening 31 in the tender deck, where fuel could fall through and be lost unless otherwise prevented.

I, therefore, have provided in addition to a novel conduit means for conveying fuel from the rear unit B of the conveyor system to the forward unit A of the system, a novel shielding means covering the conduit. Fuel is thus transferred from unit B to unit A with little increase in the total vertical height of the system, which is important in the economy of tender construction, without having any conveyor apparatus extending above the deck of the tender to interfere with the relatively smooth contours thereof, and without loss of fuel by its dropping between the troughs. The novel conduit and shielding structure is shown in Figs. 2-5 of the drawings, to which reference is now directed.

At the forward end of unit B, of the conveyor system, is an opening 90 in the forward end wall 83 of the trough 72, through which projects the end 91 of conveyor screw shaft 80, and, extending beyond the terminus of said shaft end 91, there is a free tapering end 92 of the screw flight which by its tumbling action assists in delivering the fuel into the transfer conduit 94.

Conduit 94 is attached by flange 95 to the end wall 83 of the trough 72, and at such point the section across the conduit 94 is circular as is the opening 90 in the end of said trough. Extending forwardly and upwardly is a section 96 of the conduit 94 which gradually changes in cross sectional shape to a flattened oval, the flattening being on the top and bottom portions of the conduit, with the total cross sectional area gradually increasing to the open end 96a thereof, best seen in Fig. 3, which is in the forwardly and horizontally extending portion 95 of the said conduit. As is seen in Fig. 5, the portions 96 and 97 of conduit 94 extend upwardly and over the gear casing 84, of the front unit A of the conveyor system, and overhangs the rear end of the trough 43 so that fuel delivered out of the conduit 94 falls into the trough 43 and is carried by screw 45 forwardly to be delivered through conduits 47 and 48 (Fig. 1), as before described.

To prevent fuel from dropping down through the opening 31 in the tender deck, between the rear end of trough 43 and the forward end of trough 72, I provide a shield having a top section 100 (Fig. 5), a forward sloping section 101, and a rearward sloping section 102, the rearward sloping section being secured between flange 95 and end 83 of the trough 72 of the rear conveyor B, and the forward sloping section 101 (see Fig. 3) extending between and being welded to sides 35 and 36 of the hopper. The top section 101 of the shield substantially fills the opening 31, crosswise, and extends slightly above the deck 30. The sloping portion 101 of the shield, also extends under the deck on each side to end at the said side walls 35 and 36 of the hopper. In this manner fuel is prevented from falling between the front conveyor unit A and the rear conveyor unit B, being directed by slope 101 into the forward conveyor unit A or by slope 102 into the rear conveyor unit B.

Figure 5:
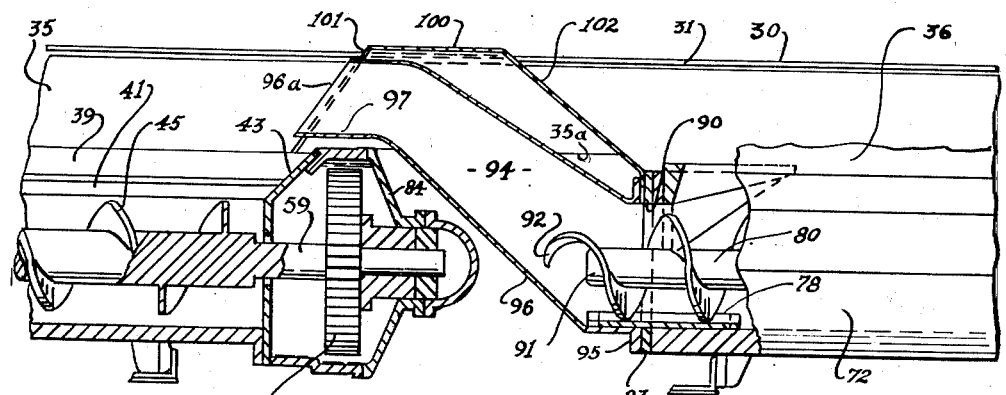
Fig. 5 is a section through the rear end of the front conveyor and the front end of the rear conveyor on the line 5—5 of Fig. 1.

It will be seen, by reference to Fig. 5, that the free end 92 of the conveyor screw of the rear unit B provides for a tumbling of the fuel delivered from said rear conveyor unit B and assists its movement through the conduit 94, thus effectively helping the transfer of fuel from the rear conveyor unit B to the front conveyor unit A.

In operation, when the fuel bin of the tender is full, only the front conveyor screw 45 need be operated, such being the case until all the fuel that will fall into the trough 43 of the front conveyor has been exhausted. At that time the rear conveyor screw 74 is set into motion by the operation of handle 69 and fuel falling into trough 72 will be conveyed through conduit 94 and by means of the front conveyor unit A through the delivery end of said front conveyor, and from there into the delivery conduits 47 and 49.

By my construction, I have overcome the difficulties in applying conventional fuel conveyors in tandem arrangement beneath the fuel bin of unusually long locomotive tenders. Heretofore, various expedients have been used as by placing the delivery end of one conveyor over the receiving end of another in staggered or offset fashion, complicating the installation and removal of the conveyors, their repair, and calling for dimensional changes in the construction of standard tenders.

I am aware that the device described and illustrated herein may be varied considerably without departing from the spirit of my invention, and, therefore, I claim my invention broadly, as indicated by the appended claims.

Having thus described my invention what I claim as new and useful and desire to secure by Letters Patent, is:

1. A fuel conveyor system for a locomotive tender provided with a fuel bin having a floor with a longitudinal fuel feed opening therein, including, in combination, two fuel conveyors each having a trough with an open side wall disposed beneath the fuel feed opening, a pair of conveyor screws rotatable in the trough, and a driving mechanism at the rear of the screw, said conveyors being positioned rear end of one to the delivery end of the other, with the troughs and screws in axial alignment, and beneath the longitudinal opening in the floor of the fuel bin; a delivery conduit extending between the adjacent ends of said conveyors and by-passing the intervening driving mechanism, said delivery conduit between the conveyors being flattened horizontally in the portion adjacent the intervening drive mechanism, and a screw flight on the end of the rear screw terminating adjacent the receiving end of the delivery conduit between the conveyors for tumbling the fuel fed to said delivery conduit.

2. A locomotive fuel stoker system, including, in combination, a front horizontal fuel conveyor comprising a fuel-receiving trough, a fuel conveyor screw rotatably mounted in the fuel-receiving trough, and a rear drive mechanism by which the screw is turned; a rear horizontal fuel conveyor having a fuel-receiving trough, a conveyor screw rotatably mounted in the fuel-receiving trough, and a rear drive mechanism, said conveyors being placed in the bottom of a locomotive tender beneath a lengthwise aperture in the floor of a fuel compartment therein, with the delivery end of the rear conveyor abutting the drive mechanism of the front conveyor and with the axes of the two conveyor screws in alignment; a curved conduit connected to the delivery end of the rear conveyor and extending upwardly and forwardly across the drive mechanism for the front conveyor, to open into the rear end of the trough of the front conveyor, said conduit at the receiving end being substantially circular in cross section but gradually flattening on top and bottom as it extends upwardly by and horizontally across the said rear drive of the front conveyor, to minimize the vertical height of the system without impairing the delivery capacity thereof, and a screw flight on the delivery end of the rear screw terminating adjacent the receiving end of the curved conduit for tumbling the fuel discharged therein.

3. A system for conveying fuel from a long tender to a locomotive, including, in combination, a front trough extending horizontally under the forward part of longitudinal opening in the floor of a tender said opening having depending side walls extending into the trough; a fuel conveyor screw rotatably mounted in the trough; a drive means at the rear end of the trough for rotating the screw; a rear trough extending horizontally under the rear part of the opening in the floor of the tender and in alignment with the front trough, the delivery end of the rear trough abutting the drive means of the front screw; a fuel conveyor screw rotatably mounted in the rear trough, in axial alignment with the conveyor screw of the front trough; a rear drive mechanism for the screw of the rear trough; a by-pass conduit for receiving fuel from the delivery end of the rear trough for conveying said coal upwardly and across the screw drive means of the front trough to the rear end of the front trough, said conduit being circular in cross section at its receiving end but becoming flatly oval as it crosses said drive means; and a plate-like shield extending across the by-pass conduit and having portions sloping downwardly to the rear end of the front trough and the front end of the rear trough, and said shield extending between the sides of the longitudinal opening in the floor of the tender, to prevent fuel from dropping between the adjacent ends of the trough.

4. The combination of claim 3 in which the drive means for both screws may be actuated together, said means being adjustable so that only the front screw is driven.

5. In a locomotive tender having a coal bin provided with one or more openings in the floor thereof, disposed longitudinally of the tender, the combination of a plurality of troughs disposed in spaced relation end to end in a common plane, one trough below each opening with an open side in communication with one of the openings in the tender floor; a rotatable screw in each of said troughs; individual driving means for each of said screws and operatively connected to the rear end thereof; power means operatively associated with the driving means for the screw in the foremost trough; power-transmission means operatively associated with the driving means for the screw in any subsequent trough; a clutch-like device interposed between said power and said transmission means whereby the screw in any subsequent trough may be actuated simultaneously with the screw in the foremost trough or remain inoperative; a conduit-shaped element, having a discharge end with a flat top side, associated with the forward end of any subsequent trough, arranged to receive coal from the screw therein and deliver the same into the rear end of the adjacent trough forward thereof, whereby the coal may be transferred serially from trough to trough in a forward direction, and a screw flight on the end of the rear screw terminating adjacent the receiving end of the receiving element for tumbling the coal fed therein.

WILLIAM T. HANNA.

REFERENCES CITED

The following references are of record in the file of this patent:

UNITED STATES PATENTS

| Number | Name | Date |
| --- | --- | --- |
| 1,952,691 | Surdykowski | Mar. 27, 1934 |
| 2,003,455 | Myers | June 4, 1935 |
| 2,007,095 | Myers | July 2, 1935 |
| 2,013,467 | Ketchpel | Sept. 3, 1935 |
| 2,029,297 | Peyton | Feb. 4, 1936 |
| 2,051,956 | Lower | Aug. 25, 1936 |
| 2,237,938 | Ketchpel | Apr. 8, 1941 |